United States Patent [19]

McGinn

[11] Patent Number: 4,605,965
[45] Date of Patent: Aug. 12, 1986

[54] UNIVERSAL VERTICAL COUNTDOWN AND METHOD FOR VIDEO DISPLAY

[75] Inventor: Michael McGinn, Scottsdale, Ariz.

[73] Assignee: Motorola, Inc., Schaumburg, Ill.

[21] Appl. No.: 730,525

[22] Filed: May 6, 1985

[51] Int. Cl.$^4$ .............................................. H04N 5/04
[52] U.S. Cl. .................... 358/148; 358/154; 358/158
[58] Field of Search ............... 358/148, 149, 150, 151, 358/154, 158

[56] References Cited

U.S. PATENT DOCUMENTS

| | | | |
|---|---|---|---|
| 4,110,789 | 8/1978 | Maly | 358/154 |
| 4,227,214 | 10/1980 | Morito | 358/158 |
| 4,228,461 | 10/1980 | Weissmueller | 358/148 |
| 4,298,890 | 11/1981 | Lai | 358/158 |
| 4,306,250 | 12/1981 | Summers | 358/148 |
| 4,319,275 | 3/1982 | Tanaka | 358/154 |
| 4,360,825 | 11/1982 | Srivastava | 358/150 |
| 4,383,273 | 5/1983 | Lunn | 358/148 |
| 4,402,011 | 8/1983 | Newton | 358/154 |
| 4,468,699 | 8/1984 | Kröner | 358/148 |
| 4,498,103 | 2/1985 | Aschwanden | 358/158 |

Primary Examiner—Howard W. Britton
Attorney, Agent, or Firm—Dale E. Jepsen

[57] ABSTRACT

A universal vertical countdown and method for a video display is provided which will handle all standard vertical signals and systems while giving the same noise performance as a self-locking system. Control of the resetting of the countdown during the acquisition phase enables the use of a single set of storage elements to provide all major decodes necessary for the system.

35 Claims, 3 Drawing Figures

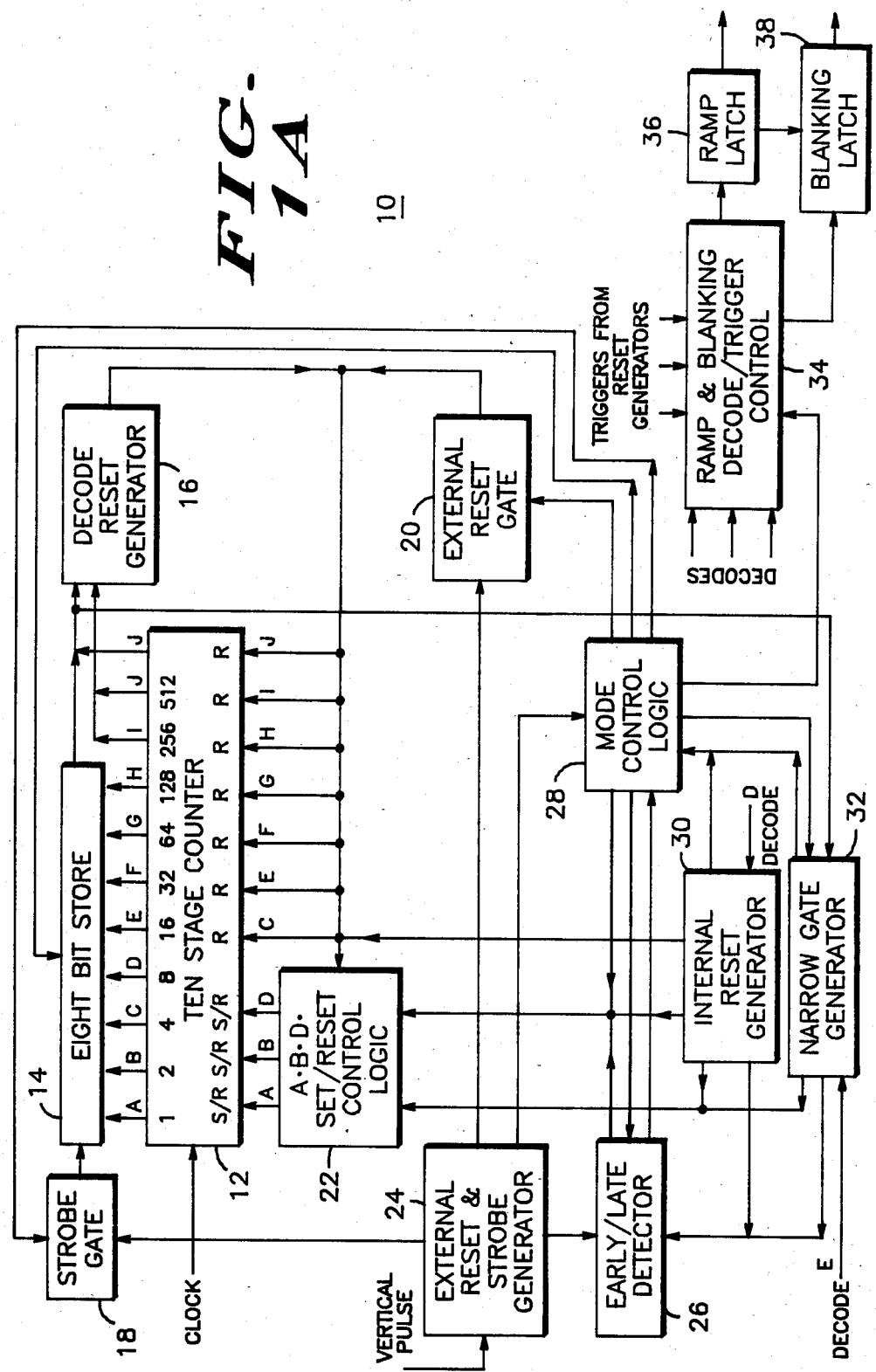

UNIVERSAL VERTICAL COUNTDOWN AND METHOD FOR VIDEO DISPLAY

BACKGROUND OF THE INVENTION

The present invention relates, in general, to the field of television and video display vertical deflection systems. More particularly, the present invention relates to a universal vertical countdown and method for a video display which will handle all known vertical signals and systems having any number of lines per picture over the range of 513 to 781 lines while providing noise immunity comparable to a dedicated self-locking countdown.

Presently, there are two primary approaches for deriving a vertical pulse in a television or other video display. These two systems are commonly referred to as either injection locked or self-locking systems. In the former injection-locked systems, the vertical pulse is directly locked by the incoming vertical signal at all times. Typically, the vertical input signal is derived from a countdown from the horizontal frequency which, in the United States, is typically 15,734 Hz resulting in a nominal vertical of 525 lines per picture. This injection locked approach will handle both standard and non-standard (free-running vertical), even those in which the horizontal and vertical are not locked, over a somewhat limited range of frequencies. However, its noise performance is relatively poor compared to the alternative self-locking systems.

Certain injection locked systems include both wide and narrow acquisitions modes, the latter mode being utilized to provide improved noise immunity. However, the use of this system does not provide satisfactory operation when applied, for example, in rural areas where the vertical pulse is not derived from the horizontal oscillator but rather from the power source itself. In such instances, the power source may be simply a diesel generator which is nominally run at 50 Hz from whence the vertical pulse is derived. As a result, the supply is generally not accurately controlled and such injection locked systems will maintain operation only in the wide acquisition mode. In this mode, the incoming vertical pulses are monitored to see if they fall within a narrow range of frequencies such that the system can switch to the narrow mode. In those instances in which the vertical pulse is not locked to the horizontal and the vertical frequency is outside of the above narrow range, the injection locked system would remain in the wide acquisition mode and would therefore be more noise sensitive and subject to triggering over a wider range.

Typical self-locking systems utilize an internal countdown to provide improved noise performance but as a result cannot handle some types of non-standard or free-running vertical signals. As with the injection locked systems, the lock range is normally limited to a narrow pulse range to maintain performance. As a consequence, the vertical may drift resulting in picture roll-up and pull-down.

It would therefore be highly advantageous to provide a universal vertical countdown and method for a video display which can handle both U.S. (525 lines per picture) and European (625 lines per picture) as well as all non standard or free-running vertical signals. In addition, it would be highly desirable to provide a system and method which can lock over a wide range of line systems in addition to those in which the vertical pulse is not derived from the horizontal but rather from a typically poorly regulated power supply.

SUMMARY OF THE INVENTION

It is therefore an object of the present invention to provide an improved universal vertical countdown and method for a video display.

It is further an object of the present invention to provide an improved universal vertical countdown and method for a video display which can handle all standard and non-standard (free-running) vertical systems while exhibiting the same noise immunity as a self-locking system as well as improved performance over injection locked systems.

It is still further an object of the present invention to provide an improved universal vertical countdown and method for a video display which eliminates the frequency drift encountered in prior art techbniques and provides a substantially jump-free vertical signal with automatic height adjustment.

It is still further an object of the present invention to provide an improved universal vertical countdown and method for a video display which provides for automatic adaptation to incoming signals over a range of 513 to 781 lines per picture.

It is still further an object of the present invention to provide an improved vertical countdown and method for a video display which utilizes only a single 8 bit counter store thereby providing a considerable saving in on-chip area and concomitant cost in an integrated circuit system.

The foregoing and other objects are achieved in the present invention wherein there is provided a universal vertical countdown for initiating vertical ramp retrace in a video display. The universal vertical countdown includes an external reset pulse generator for producing a plurality of external reset pulses in response to an external vertical pulse train. A mode control logic circuit is coupled to the external reset pulse generator for controlling the initiation of the vertical ramp retrace in response to the external reset pulses. A counter is coupled to the external reset pulse generator for measuring a frequency value of the external reset pulses in response to the first and second pulses thereof. A counter store is coupled to the counter for storing the frequency value measured. A narrow gate generator is coupled to the mode control logic circuit and the counter for activating a gate signal in anticipation of a third external reset pulse. An internal reset pulse generator is coupled to the mode control logic circuit and the counter for generating a plurality of internal reset pulses at the stored frequency value. The mode control logic circuit detects an occurrence of the third external reset pulse within the gate signal and initiates the vertical ramp retrace in response to the internal reset pulses if the occurrence is detected and a fourth external reset pulse is coincident with one of the internal reset pulses. In a more specific embodiment, an early/late detector is responsive to the mode control logic circuit and coupled to the external and internal reset pulse generators as well as the narrow gate generator for evaluating whether the external reset is advanced or coincident with, or delayed with respect to, the internal reset pulse. A set/reset control logic circuit is coupled to the counter and the early/late detector for adjusting the effective stored frequency value by a predetermined amount to maintain the coincidence of the external and internal reset pulses.

Also provided is a universal vertical countdown and method for initiating vertical ramp retrace which includes circuitry for deriving a plurality of external reset pulses in response to an external vertical pulse train. Circuitry is also provided for initiating the vertical ramp retrace in response to the external reset pulses in addition to that for measuring a frequency value of the external reset pulse in response to first and second pulses thereof. A circuit for storing the measured frequency value is provided as well as that coupled to the storing circuit for activating a gate signal at a predetermined time in anticipation of a third of the external reset pulses in response to the stored frequency value. A generating circuit provides a plurality of internal reset pulses at the stored frequency value and an occurrence of the third one of the external reset pulses within the gate signal is detected. Circuitry is provided for alternatively initiating the vertical ramp retrace in response to the internal reset pulses if the third external reset pulse occurs within the gate signal and a fourth one of the external reset pulses is coincident with one of the internal reset pulses. More specific embodiments include circuitry for evaluating the external and internal reset pulses for coincidence and adjusting the stored frequency value by a predetermined amount to maintain the coincidence of the external and internal reset pulses.

BRIEF DESCRIPTION OF THE DRAWINGS

The above-mentioned and other features and objects of the present invention and the manner of attaining them will become more apparent and the invention itself will be best understood by reference to the following description of an embodiment of the invention taken in conjunction with the accompanying drawings, wherein:

FIG. 1A is a representative logic flow diagram of a universal vertical countdown in accordance with the present invention which measures the incoming frequency of a vertical pulse and stores it in a single 8 bit store for providing a vertical ramp retrace in response to either the external reset pulses or internally generated reset pulses;

DESCRIPTION OF A PREFERRED EMBODIMENT

Figure 1B:
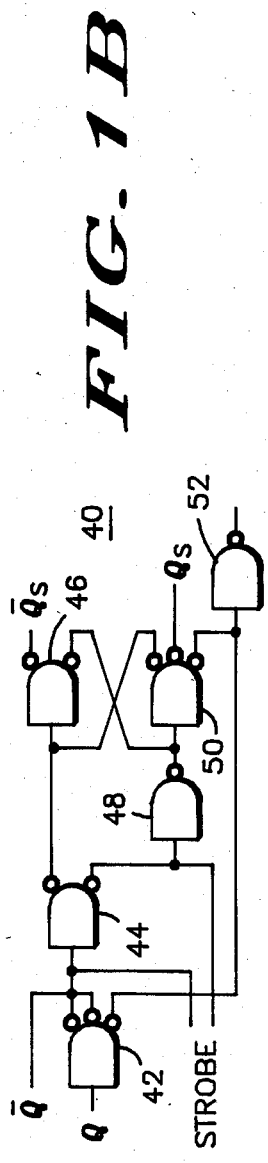
FIG. 1B is a partial schematic diagram of a typical counter store comprising a portion of the 8 bit store of FIG. 1A.

With reference to FIG. 1A, a vertical countdown 10 in accordance with the present invention is shown. Vertical countdown 10 includes 10 stage counter 12 having outputs thereof (A-H corresponding to bits 1-128 respectively) coupled to the input of 8 bit store 14. Additional outputs of 10 stage counter 12 (1-J corresponding to bits 256 and 512 respectively) are supplied as input to decode reset generator 16. The output of 8 bit store 14 is supplied as input, with an additional output of 10 stage counter 12, to decode reset generator 16 and narrow gate generator 32.

Vertical countdown 10 additionally receives a vertical pulse input to external reset and strobe gate 24, the outputs of which are supplied to strobe gate 18, external reset gate 20, mode control logic circuit 28 and early-/late detector 26. The output of external reset and strobe generator 24 applied to strobe gate 18 is provided as input to 8 bit store 14 upon the application of a control signal from mode control logic circuit 28 to strobe gate 18. An additional output of mode control logic circuit 28 is applied directly to 8 bit store 14. A further control output of mode control logic circuit 28 is applied to external reset gate 20 the output of which is combined with the output of decode reset generator 16 as well as an output of internal reset generator 30 for application to reset inputs (C-J) of 10 stage counter 12. The same output from decode reset generator 16, external reset gate 20 and internal reset generator 30 is applied as a control input to set/reset control logic circuit 22. Set/reset control logic circuit 22 has as inputs the output of internal reset generator 30 and narrow gate generator 32. The output of set/reset control logic circuit 22 is applied to the set/reset inputs (A, B and D) of 10 stage counter 12 to which also is applied a clocking input. An additional input to set/reset control logic circuit 22 is applied from early/late detector 26 in combination with that of mode control logic circuit 28. Early/late detector 26 also supplies an input to mode control logic circuit 28 which in turn provides a control input to early/late detector 26.

Internal reset generator 30 and narrow gate generator 32 provide a common input to early/late detector 26. Internal reset generator 30 and narrow gate generator 32 are respectively coupled to the D and E decode outputs of 10 stage counter 12. Mode control logic circuit 28 provides a control input to narrow gate generator 32 which in turn provides an output in combination with that of internal reset generator 30 for input to mode control logic circuit 28. An output of mode control logic circuit 28 is applied to ramp and blanking decode/trigger control circuit 34 which has as additional inputs various decodes and triggers from the reset generators. Outputs of ramp and blanking decode/trigger control circuit 34 are applied to ramp latch 36 and blanking latch 38. Ramp latch 36 provides an input to blanking latch 38 and both ramp latch 36 and blanking latch 38 provide outputs for subsequent initiation of vertical ramp retrace in a video display.

Referring additionally now to FIG. 1B, a counter store 40 comprising a portion of 8 bit store 14 is shown. Counter store 40 includes a plurality of NAND gates functioning as inverters such as NAND gate 42 having an input Q. NAND gate 42, provides an output Q as well as well as an input to NAND gate 52. The input to NAND gate 44 is also received as a strobe signal. NAND gate 44 has one output connected to the input of NAND gate 46 and another in common with a strobe input to the input of NAND gate 48. The output of NAND gate 48 is connected to the input of NAND gate 50 which is coupled in a latching configuration with NAND gate 46 having one output connected to the input of NAND gate 46 which in turn has an output connected to the input of NAND gate 50. An additional output of NAND gate 46 provides an output signal $Q_S$ while a second output of NAND gate 50 provides an output signal $Q_S$. A third output of NAND gate 50 is supplied in combination with an output of NAND gate 42 as input to NAND gate 52 which in turn provides an inverted signal at its output.

Figure 2:
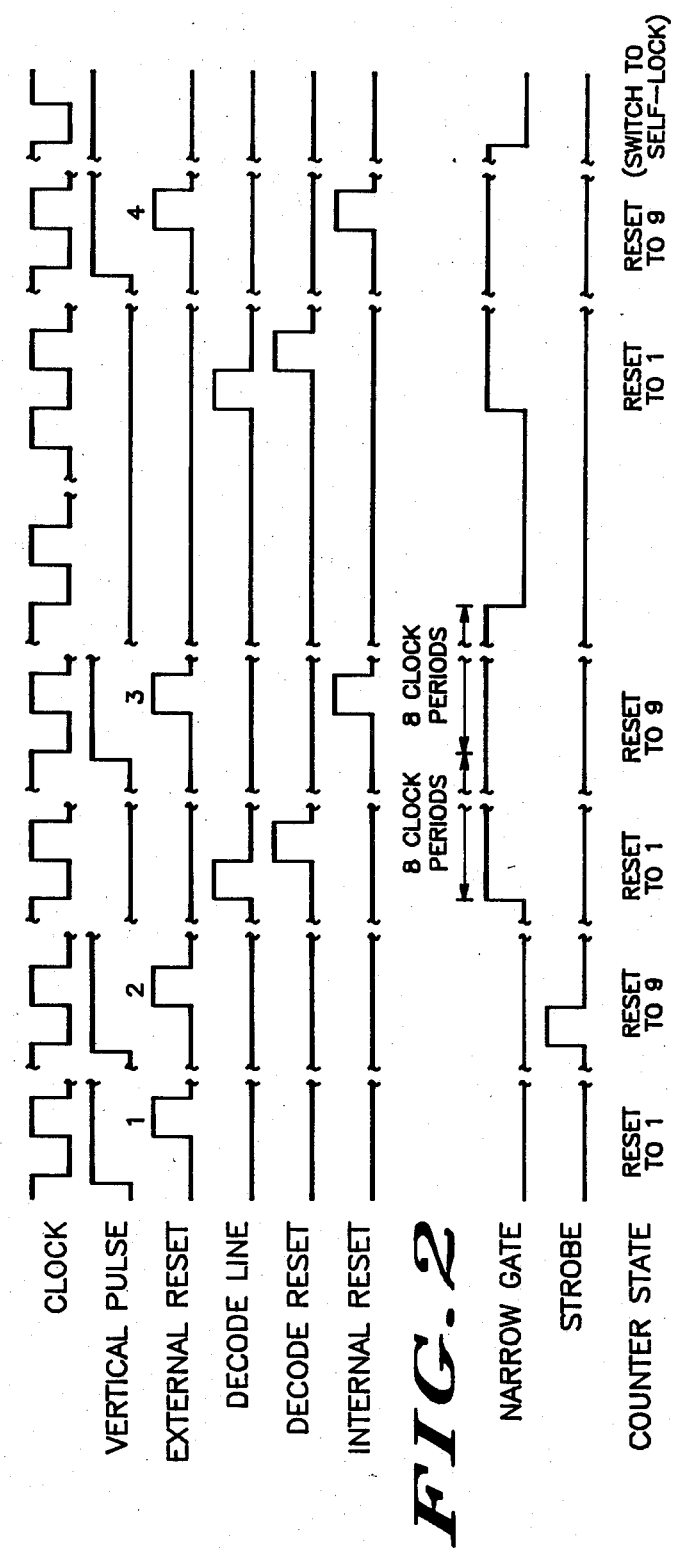
FIG. 2 provides a comparison of representative wave forms useful in understanding the operation of the universal vertical countdown of FIGS. 1A and 1B illustrating its operation in initiating vertical ramp retrace in response to internal reset pulses.

Referring additionally now to FIG. 2, representative wave forms appearing at selected portions of vertical countdown 10 are shown in relation to the clocking input applied to 10 stage counter 12. Upon input of a vertical pulse to external reset and strobe generator 24, an external reset pulse is output therefrom on the positive going transition of the next clock cycle. This external reset pulse then is defined as pulse 1. Thereafter, upon receipt of the second vertical pulse input to external reset and strobe generator 24, a second external reset pulse is generated at the positive going transition of the clocking signal to 10 stage counter 12. Upon receipt of the second external reset pulse, a frequency value is measured by 10 stage counter 12 and stored in 8 bit store 14. thereafter, at 8 clock periods before the anticipated receipt of a third vertical pulse input to external reset and strobe generator 24, a decode line is pulsed for one clock cycle followed by a decode reset pulse input to 10 stage counter 12 on the following positive going transition of the clock signal. Concurrently with the positive pulse on the decode line, a narrow gate pulse is generated having a width of 8 clock periods before the anticipated vertical pulse input to external reset and strobe generator 24 as well as 8 clock periods thereafter. As illustrated in the representative wave forms of FIG. 2, a third external reset pulse output of reset and strobe generator 24 occurs within the narrow gate pulse as shown and is coincident with an internal reset pulse provided by internal reset generator 30. Thereafter, the decode line provides an additional pulse indicating the initiation of a second narrow gate pulse from narrow gate generator 32. On the next positive going clock transition, a decode reset pulse is applied to 10 stage counter 12. Thereafter, the fourth external reset pulse falls with the second narrow gate pulse and is coincident with the second internal reset pulse output of internal reset generator 30. Due to this coincidence, vertical countdown 10 will thereafter operate in accordance with the internal reset pulses and not the external reset pulses defined by the input vertical pulse to external reset and strobe generator 24.

As shown, 10 stage counter 12 is reset to one by the first external reset pulse and thereafter reset to 9 by the second reset pulse. A pulse output of decode reset generator 16 sets 10 stage counter 12 to one while a following internal reset pulse resets it to 9. When the fourth external reset pulse coincides with an internal reset pulse, vertical countdown 10 is set to self-lock and 10 stage counter 12 is reset to 9.

In operation, vertical countdown 10 economically combines the best features of both injection locked and self-locking systems over a range of 513 to 781 lines per picture. Moreover, vertical countdown 10 is capable of handling both standard and non-standard signals with no loss of performance. Vertical countdown 10 will therefore automatically adapt to standard U.S. (525) and European (625) line per picture systems and to the wide range of signals likely to be countered in developing areas such as the People's Republic of China (600–710 lines per picture).

After 15 consecutive absent vertical pulses input to external reset and strobe generator 24 of vertical countdown 10, a countdown sequence will switch to a "wide" injection locked mode and free run at a frequency equivalent to 769 lines per picture. When a signal is received at the vertical pulse input to external reset and strobe generator 24, vertical countdown 10, under control of mode control logic circuit 28 measures and stores the frequency of the incoming signal. This occurs with the arrival of the first two vertical pulses. For the next two vertical pulses received, the stored decode line, internal reset generator 30 and narrow gate generator 32 become operational. Due to the control of ten stage counter 12 resetting during this sequence (as shown in FIG. 2), the position of the third and fourth external reset pulses output of external reset and strobe generator 24 should coincide with the internally generated reset pulses from internal reset generator 30. If the third external reset pulse is within the narrow gate defined by narrow gate generator 32 and coincidence occurs on the fourth external reset pulse, the countdown switches to a self resetting mode. In this mode, the countdown is reset by decode reset generator 16 and the internal reset pulses from internal reset generator 30 only and not by external reset pulses. Concurrently, the vertical ramp retrace is initiated only by the internal reset pulses. In this "self-locking" mode the countdown remains locked to a free running vertical signal, that is, the vertical is not locked to the horizontal frequency. This is accomplished by adjusting the decode reset plus or minus one count under the control of early/late detector 26. However, vertical countdown 10 will stay in the injection locked mode in the event that odd and even fields of the signal are different by more than plus or minus one count and thereupon be reset by the external reset pulse. In this way, all signals requiring a high degree of noise immunity such as off air signals etc., are handled in the noise immune self-locking mode. The only exception to this occurs when a non-standard signal such as from a VCR occurs. This latter instance would be handled in the injection locked mode with an obvious decrease in noise immunity. However, since high noise immunity is not as important with a VCR signal, operation in the injection locked mode under these circumstances will not degrade performance.

What has been provided, therefore, is an improved universal vertical countdown and method for a video display and one which can handle all standard and non-standard (free running vertical) systems all exhibiting the same noise immunity as a self-locking system as well as improved performance over injection locked systems. The circuit and method of the present invention eliminates the frequency drift encountered in prior art techniques and provides a substantially jump-free vertical signal with automatic height adjustment. The universal vertical countdown and method of the present invention provides for automatic adaptation to incoming signals over a range of 513 to 781 lines per picture and utilizes only a single 8 bit counter store thereby providing a considerable saving in on-chip area and concomitant cost in an integrated circuit system.

While there have been described above the principles of the present invention in conjunction with specific circuitry, it is to be clearly understood that the foregoing description is made only by way of example and not as a limitation to the scope of the invention.

What is claimed is:

1. A universal vertical countdown for initiating vertical ramp retrace in a video display comprising:
    means for deriving a plurality of external reset pulses in response to an external vertical pulse train;
    means for initiating said vertical ramp retrace in response to said external reset pulses;
    means for measuring a frequency value of said external reset pulses in response to first and second ones thereof;
    means for storing said frequency value;
    means coupled to said storing means for activating a gate signal at a predetermined time in anticipation of a third one of said external reset pulses in response to said stored frequency value;

means for generating a plurality of internal reset pulses at said stored frequency value;

means for detecting an occurrence of said third one of said external reset pulses within said gate signal; and means for alternatively initiating said vertical ramp retrace in response to said internal reset pulses if said third external reset pulse occurs within said gate signal and a fourth one of said external reset pulses is coincident with one of said internal reset pulses.

2. The universal vertical countdown of claim 1 further comprising:

means for evaluating said external and internal reset pulses for coincidence; and means for adjusting said stored frequency value by a predetermined amount to maintain said coincidence of said external and internal reset pulses.

3. The universal vertical countdown of claim 1 wherein said steps of initiating, detecting and alternatively initiating are carried out by means of a mode control logic circuit.

4. The universal vertical countdown of claim 3 wherein said deriving means further comprises a strobe gate for supplying a strobe signal to said storing means in response to an enable input from said mode control logic circuit.

5. The universal vertical countdown of claim 3 wherein said mode control logic circuit iurther comprises an external reset gate coupling said deriving and measuring means.

6. The universal vertical countdown of claim 3 wherein said mode control logic circuit further comprises a ramp and blanking decode/trigger control circuit.

7. The universal vertical countdown of claim 1 wherein said measuring means further comprises a set/reset control logic circuit for setting said measuring means in response to said activating and generating means.

8. The universal vertical countdown of claim 1 wherein said deriving means comprises an external reset pulse generator.

9. lhe universal vertical countdown of claim 1 wherein said measuring means comprises a counter.

10. The universal vertical countdown of claim 1 wherein said storing means comprises a plurality of bit latches.

11. The universal vertical countdown of claim 1 wherein said activating means comprises a narrow gate generator.

12. The universal vertical countdown of claim 1 wherein said generating means comprises an internal reset pulse generator.

13. The universal vertical countdown of claim 2 wherein said evaluating means comprises an early/late detector.

14. The universal vertical countdown of claim 2 wberein said adjusting means comprises a set/reset control logic circuit.

15. The universal vertical countdown of claim 1 wherein said external reset pulses have a pulse width of one half clock period and said predetermined time for said external reset pulses is substantially equal to nine clock periods.

16. The universal vertical countdown of claim 15 wherein said predetermined amount is substantially equal to one half clock period.

17. A the universal vertical countdown for initiating vertical ramp retrace in a video display comprising:

an external reset pulse generator for producing a plurality of external reset pulses in response to an external vertical pulse train;

a mode control logic circuit coupled to said external reset pulse generator for initiating said vertical ramp retrace in response to said external reset pulses;

a counter coupled to said external reset pulse generator for measuring a frequency value of said reset pulses in response to first and second ones thereof;

a counter store coupled to said counter for storing said frequency values;

a narrow gate generator coupled to said mode control logic circuit and said counter store for activating a gate signal in anticipation of a third one of said external reset pulses; and an internal reset pulse generator coupled to said mode control logic circuit and said narrow gate generator for generating a plurality of internal reset pulses at said frequency value;

said mode control logic circuit for detecting an occurrence of said third one of said external reset pulses within said gate signal and initiating said vertical ramp retrace in response to said internal reset pulses if said occurrence is detected and a fourth one of said external reset pulses is coincident with one of said internal reset pulses.

18. The universal vertical countdown of claim 17 further comprising:

an early/late detector responsive to said mode control logic circuit coupled to said external and internal reset pulse generators and said narrow gate generator for evaluating said external and internal reset pulses for coincidence; and a set/reset control logic circuit coupled to said early/late detector and said mode control logic circuit for adjusting said stored frequency value by a predetermined amount to maintain said coincidence of said external and internal reset pulses.

19. The universal/vertical countdown of claim 17 wherein said external reset pulse generator further comprises a strobe gate for supplying a strobe signal to said counter store in response to an enable input from said mode control logic circuit.

20. The universal vertical countdown of claim 17 wherein said mode control logic circuit further comprises an external reset gate coupling said external reset pulse generator and said counter.

21. The universal vertical countdown of claim 17 wherein said mode control logic circuit further comprises a ramp and blanking decode/trigger control circuit.

22. The universal vertical countdown of claim 17 wherein said counter further comprises a set/reset control logic circuit for setting said counter in response to said external and internal reset pulse generators and a decode/reset generator controlled by said mode control logic circuit and said early/late detector.

23. The universal vertical countdown of claim 17 wherein said counter store comprises a plurality of bit latches.

24. The universal vertical countdown of claim 17 wherein said external reset pulses have a pulse width of one half clock period and said predetermined time for said external reset pulses is substantially equal to nine clock periods.

25. The universal vertical countdown of claim 24 wherein said predetermined amount is substantially equal to one half clock period.

26. A method for initiating vertical ramp retrace in a video display comprising the steps of:
  receiving an external vertical pulse train;
  deriving a plurality of external reset pulses in response to said external vertical pulse train;
  initiating said vertical ramp retrace in response to said external reset pulses;
  measuring a frequency value of said external reset pulses in response to first and second ones thereof;
  storing said frequency value;
  activating a gate signal at a predetermined time in anticipation of a third one of said external reset pulses in response to said stored frequency value;
  generating a plurality of internal reset pulses at said stored frequency value;
  detecting an occurrence of said third one of said external reset pulses within said gate signal; and
  alternatively initiating said vertical ramp retrace in response to said internal reset pulses if said third external reset pulse occurs within said gate signal and a fourth one of said external reset pulses is coincident with one of said internal reset pulses.

27. The method of claim 26 further comprising the steps of:
  evaluating said external and internal reset pulses for coincidence; and
  adjusting said stored frequency value by a predetermined amount to maintain said coincidence of said external and internal reset pulses.

28. The method of claim 26 wherein said steps of receiving and deriving are carried out by means of an external reset pulse generator.

29. The method of claim 26 wherein said steps of initiating, detecting and alternatively initiating are carried by means of a mode control logic circuit.

30. The method of claim 26 wherein said step of measuring is carried out by means of a counter.

31. The method of claim 26 wherein said step of storing is carried out by means of a counter store.

32. The method of claim 26 wherein said step of activating is carried out by means of a narrow gate generator.

33. The method of claim 26 wherein said step of generating is carried out by means of an internal reset generator.

34. The method of claim 27 wherein said step of evaluating is carried out by means of an early/late detector.

35. The method of claim 27 wherein said step of adjusting is carried out by means of a set/reset control logic circuit.

* * * * *